(12) United States Patent
Urabe (10) Patent No.: US 7,955,205 B2
(45) Date of Patent: Jun. 7, 2011

(54) CHAIN TENSION APPLYING DEVICE

(75) Inventor: Hiroyuki Urabe, Osaka (JP)

(73) Assignee: Shimano Inc., Sakai, Osaka (JP)

( * ) Notice: Subject to any disclaimer, the term of this patent is extended or adjusted under 35 U.S.C. 154(b) by 634 days.

(21) Appl. No.: 11/369,478

(22) Filed: Mar. 6, 2006

(65) Prior Publication Data

US 2006/0240920 A1 Oct. 26, 2006

(30) Foreign Application Priority Data

Apr. 20, 2005 (JP) ................................. 2005-122599

(51) Int. Cl.
*F16H 59/00* (2006.01)
*F16H 61/00* (2006.01)
(52) U.S. Cl. ........................................ 474/80
(58) Field of Classification Search ................ 474/80, 474/82, 83
See application file for complete search history.

(56) References Cited

U.S. PATENT DOCUMENTS

| 667,594 | A | | 2/1901 | Soucy, Jr. | |
| 3,834,246 | A | | 9/1974 | McGilp | |
| 4,069,719 | A | | 1/1978 | Cancilla | |
| 4,108,462 | A | * | 8/1978 | Martin | 280/304.4 |
| 4,150,851 | A | * | 4/1979 | Cienfuegos | 297/215.13 |
| 4,231,264 | A | * | 11/1980 | Bergles | 474/80 |
| 5,470,278 | A | | 11/1995 | Chen | |
| 5,730,670 | A | | 3/1998 | Ferrarin | |
| 6,045,470 | A | | 4/2000 | Wilcox | |
| 6,394,921 | B1 | * | 5/2002 | Fukuda | 474/80 |
| 6,454,671 | B1 | * | 9/2002 | Wickliffe | 474/80 |
| 6,695,332 | B1 | | 2/2004 | Kang | |

FOREIGN PATENT DOCUMENTS

| CN | 2320522 Y | 5/1999 |
| CN | 1511757 A | 7/2004 |
| DE | 29615334 U1 | 10/1996 |
| EP | 0 032 049 A2 | 7/1981 |
| FR | 742354 A | 3/1933 |
| FR | 43612 E | 7/1934 |
| FR | 1041382 A | 10/1953 |
| GB | 141255 A | 4/1920 |
| GB | 408915 A | 4/1934 |
| GB | 645791 A | 11/1950 |

* cited by examiner

*Primary Examiner* — Michael R Mansen
*Assistant Examiner* — Robert T Reese
(74) *Attorney, Agent, or Firm* — Jeffer Mangels Butler & Mitchell LLP (57) ABSTRACT

There is provided a chain tension applying device for a bicycle that can accommodate a change in an axial distance between a frame and a sprocket. A chain tensioner 40 is a device for applying tension to a chain 26, including: a bracket 56; a tension member 58; a securing position adjustment mechanism 60; and an urging member 62. The bracket is mountable to a frame (a mounting lug 24*b*) of the bicycle. The tension member is secured to the bracket immovably in a first direction and movably in a second direction different from the first direction, and can apply tension to the chain. The securing position adjustment mechanism can adjust a securing position of the tension member to the bracket in the first direction by sliding. The urging member urges the tension member in the second direction.

6 Claims, 7 Drawing Sheets

CHAIN TENSION APPLYING DEVICE

FIELD OF THE INVENTION

The present invention relates to a tension applying device, and more particularly to a chain tension applying device for applying tension to a chain.

BACKGROUND OF THE INVENTION

In a bicycle, a chain runs between a front sprocket and a rear sprocket. The chain is gradually stretched with use and may be removed from the sprockets. In order to prevent this from happening, a mechanism for applying tension to the chain is known. In a Japanese so-called light roadster, tension can be applied to a chain by forming a rear pawl of a normal pawl type opening rearward in a rear end of a frame, and moving a hub shaft rearward.

On the other hand, a rear pawl of a reverse pawl type opening diagonally forward and downward is formed in a rear end of a frame used in a mountain bike or the like. To a chain mounted to the frame having such a rear pawl of the reverse pawl type, tension is generally applied by a rear derailleur that is an external shift device. However, an internal shift hub as an internal shift device using a planetary gear train has recently included a larger number of stages, and an internal shift hub having no chain tension applying function is sometimes mounted to a frame having a rear pawl of a reverse pawl type. For example, when an internal shift hub and a disk brake are to be used together, a frame for a mountain bike having a brake seat is often used, and in this case, the internal shift hub is mounted to the frame of the reverse pawl type. For a frame having a rear suspension, the rear suspension generally has the center of rotation in a position spaced apart from a hub shaft to which a front sprocket is mounted. Thus, rotation of the rear suspension may change a distance between the front sprocket and the rear sprocket to cause the chain to be removed from the sprockets. In such a case, a chain tension applying device is required for accommodating a stretch of the chain and the change in the distance between the sprockets.

A conventionally known chain tension applying device is placed around a motor sprocket mounted to a motor of an electric assist bicycle (for example, see Japanese Patent Laid-Open No. 2005-075069). The conventional chain tension applying device is pivotally mounted to a fixed arm secured by a screw to a housing of a drive unit accommodating the motor. The chain tension applying device includes a spring housing bracket pivotally mounted to the fixed arm, a coil spring having one end locked to the spring housing bracket, and a support bracket that is retractably mounted to the spring housing bracket, has a tension sprocket in a tip thereof, and is urged toward a retracted side by the coil spring.

Mounting such a conventional chain tension applying device to a frame around a rear sprocket or a front sprocket prevents a chain from being removed from the sprockets even if the chain is stretched or a distance between the sprockets changes.

The conventional chain tension applying device is mounted to the housing of a motor drive via the fixed arm around the motor sprocket. The conventional chain tension applying device having such a structure is mounted to the housing of the drive unit to which the motor is mounted via a fixed bracket, which causes no change in an axial distance between the chain tension applying device and the motor sprocket, that is, a distance in a direction perpendicular to a tension direction. Thus, placing the conventional chain tension applying device on the frame around the front sprocket or the rear sprocket may prevent the change in the axial distance between the frame and the sprocket from being accommodated. Thus, chain tension applying devices need to be produced having different sizes according to axial sizes of a rear hub to which the frame and the rear sprocket are mounted and a crankshaft to which the front sprocket is mounted.

SUMMARY OF THE PREFERRED EMBODIMENTS

An object of the present invention is to provide a chain tension applying device for a bicycle that can accommodate a change in an axial distance between a frame and a sprocket.

In accordance with a first aspect of the present invention, there is provided a chain tension applying device for a bicycle including: a bracket; a tension member; a securing position adjustment mechanism; and an urging member. The bracket is mountable to a frame of the bicycle. The tension member is secured to the bracket immovably in a first direction and movably in a second direction different from the first direction, and can apply tension to the chain. The securing position adjustment mechanism can adjust a securing position of the tension member to the bracket in the first direction by sliding. The urging member urges the tension member in the second direction.

In preferred embodiments, the bracket is mounted to the frame, and the securing position of the tension member to the bracket in the first direction is adjusted by the sliding of the securing position adjustment mechanism. This allows a position where the tension member applies tension to the chain to be set to an optimum position. The securing position of the tension member in the first direction can be adjusted by the sliding of the securing position adjustment mechanism, and thus the first direction is aligned with an axial direction of a sprocket to allow a change in an axial direction between the frame and the sprocket to be accommodated.

In other preferred embodiments, the tension member includes a base member that is secured so that the securing position is adjustable by the securing position adjustment mechanism, and a movable member that is movably supported by the base member in the second direction. In this case, the securing position adjustment mechanism can be placed between the bracket and the base member, and the urging member can be placed between the base member and the movable member, thereby allowing the securing position adjustment mechanism and the urging member to be separately placed and achieving a structure with high degree of freedom of design.

In further preferred embodiments, the securing position adjustment mechanism includes a slide shaft that is placed in the first direction and secured to the bracket, and a clamp portion that is provided in the base member for securing the base member to the slide shaft so that the securing position is adjustable. In this case, the securing position adjustment mechanism can be achieved with a relatively simple configuration including the slide shaft and the clamp.

In yet further preferred embodiments, the chain tension applying device further includes a first positioning mechanism for determining a mounting phase of the base member to the bracket. In this case, mounting phases of the base member and the bracket are uniquely determined, thereby allowing the second direction to be easily set to a direction suitable for the application of the tension even if the tension member is constituted by the two members.

In still other preferred embodiments, the first positioning mechanism includes a lock protrusion protruding diametrically of the slide shaft, and a lock recess that is provided in the clamp portion and nonrotatably locked to the lock protrusion. In this case, protrusion and recess engagement allows the mounting phase to be easily positioned.

In other preferred embodiments, the movable member is pivotally supported by the base member. In this case, tension can be applied to the chain by a simple pivotable structure that may simply use a pivot shaft.

In other preferred embodiments, the movable member includes a first plate member pivotally mounted to the base member, a second plate member placed to face the first plate member, and a tension pulley that is rotatably mounted between the plate members and that the chain engages. In this case, the tension pulley that the chain engages can be held between two brake members and supported at opposite ends thereof, thereby preventing the chain from being removed from the tension pulley.

In other preferred embodiments, the movable member further includes a guide pulley that is rotatably mounted between the plate members in a position spaced apart from the tension pulley and that the chain engages. In this case, the guide pulley can bend the chain, thereby allowing tension to be effectively applied with a small amount of movement.

In still other preferred embodiments, the securing position adjustment mechanism includes a slide shaft that is placed in the first direction, and a clamp portion that is provided in the bracket for securing the tension member to the slide shaft so that the securing position is adjustable, the tension member includes a movable member that is movably supported by the slide shaft in the second direction, and the urging member is placed around the slide shaft and urges the movable member in the second direction. In this case, the securing position adjustment mechanism and the urging member can be placed in the same place, thereby providing a device with a simple structure at low costs.

In other preferred embodiments, the movable member is pivotally supported by the slide shaft. In this case, tension can be applied to the chain by a simple pivotable structure that may simply use the slide shaft of the securing position adjustment mechanism.

In other preferred embodiments, the bracket includes a second positioning mechanism that determines a mounting phase to the frame. In this case, the mounting phase of the bracket to the frame is uniquely determined, thereby allowing the second direction to be easily set to a direction suitable for the application of the tension simply by mounting the bracket to the frame.

According to the present invention, with the securing position adjustment mechanism, the securing position of the tension member in the first direction to the bracket mounted to the frame can be adjusted by the sliding, and thus the first direction is aligned with the axial direction of the sprocket to allow the change in the axial direction between the frame and the sprocket to be accommodated.

DESCRIPTION OF SYMBOLS 10 bicycle
12 frame
24 rear swing arm
24b mounting lug
40 chain tensioner (an example of a chain tension applying device)
56, 156 bracket
56c positioning piece (an example of a second positioning mechanism)
58, 158 tension member
60, 160 securing position adjustment mechanism
62, 162 urging member
66 base member
68, 168 movable member
70, 170 slide shaft
70a lock protrusion
72, 172 clamp portion
72d lock recess
74 first positioning mechanism

DETAILED DESCRIPTION OF THE PREFERRED EMBODIMENTS

Figure 1:
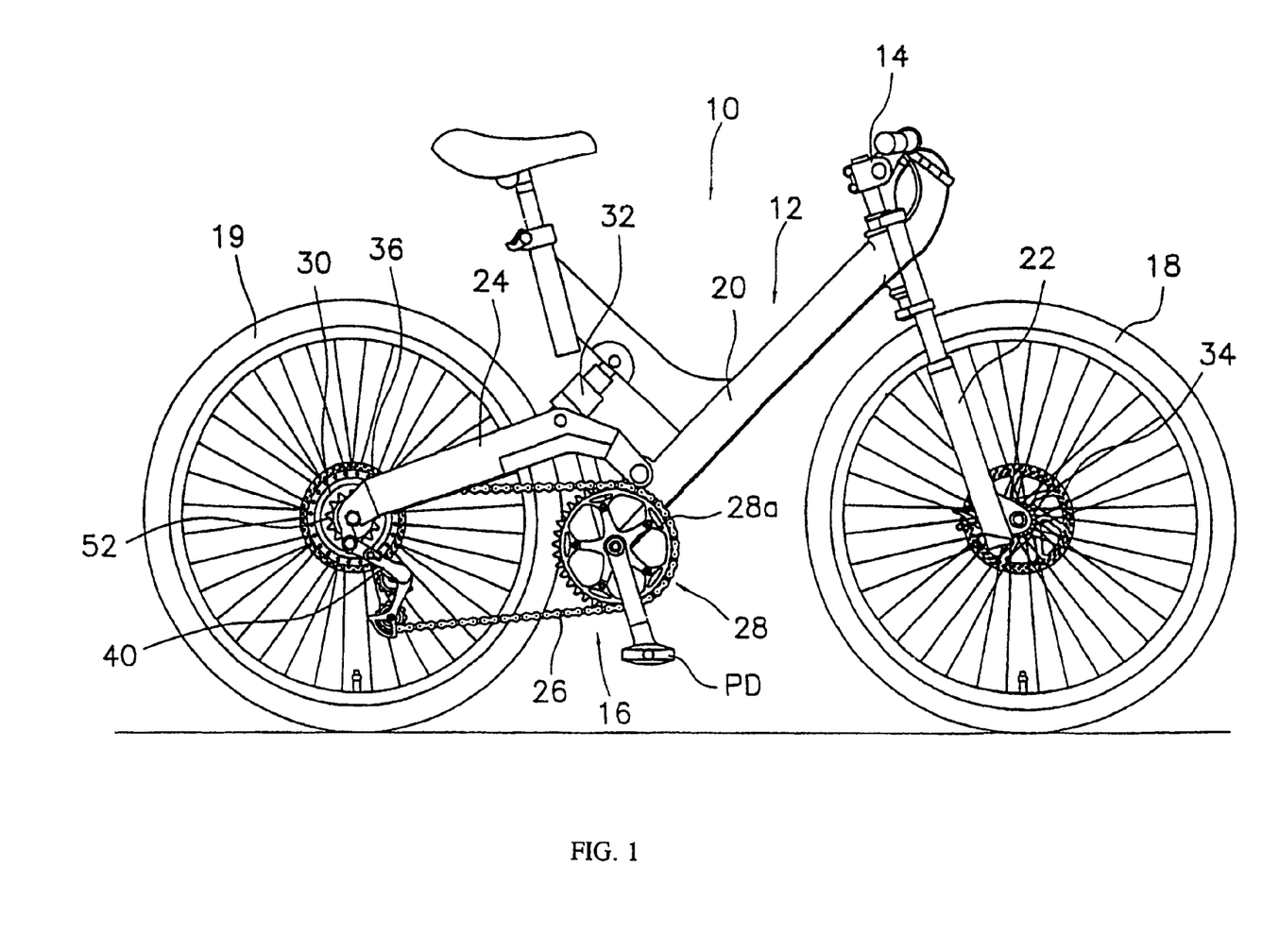
FIG. 1 is a side view of a bicycle using a first embodiment of the present invention.
Figure 3:
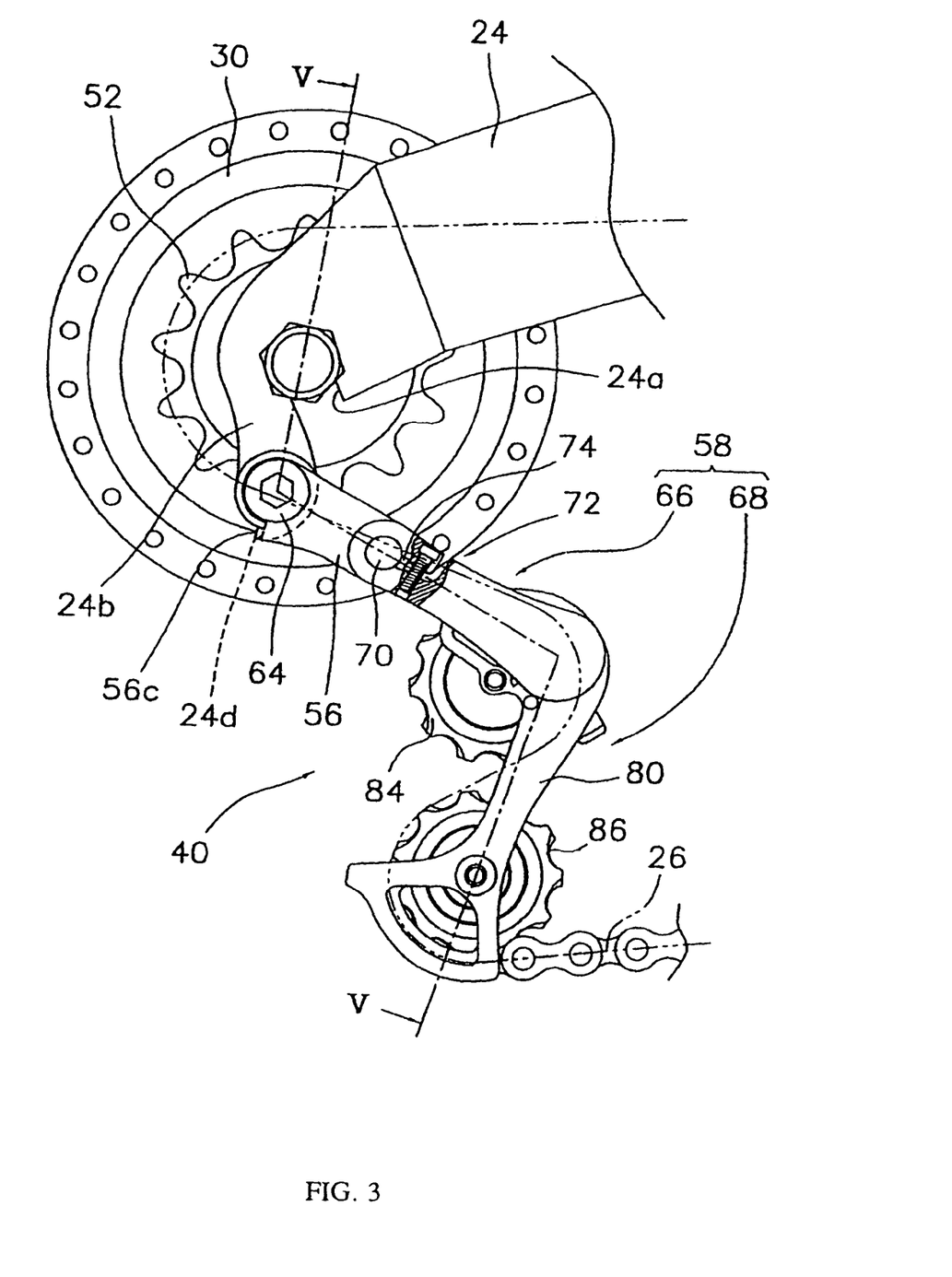
FIG. 3 is an enlarged view of a side of a rear portion of the bicycle including a chain tensioner according to the first embodiment of the present invention.

In FIG. 1, a bicycle 10 adopting an embodiment of the present invention includes a frame 12 having a frame body 20, a suspension fork 22 and a rear swing arm 24, a handle 14 secured to the suspension fork 22, a drive portion 16 including a chain 26, a gear crank 28 to which pedals PD and one front sprocket 28a are mounted, and an internal shift hub 30 or the like, and a front wheel 18 and a rear wheel 19 mounted to the suspension fork 22 and the rear swing arm 24. The suspension fork 22 is mounted to a front portion of the frame body 20 rotatably around a tilted vertical shaft. The rear swing arm 24 has a rear suspension 32 and is pivotally mounted to a rear portion of the frame body 20. As shown in FIG. 3, a rear pawl portion 24a of a reverse pawl type to which the rear wheel 19 is mounted, and a mounting lug 24b extending downward below the rear pawl portion 24a are formed in a rear end of the rear swing arm 24. In the mounting lug 24b, a screw hole 24c is formed as shown in FIG. 5, and a positioning protrusion 24d protruding downward is formed as shown in FIG. 3.

As shown in FIG. 1, a front disk brake device 34 and a rear disk brake device 36 are mounted to the front wheel 18 and the rear wheel 19. The internal shift hub 30 is also mounted to the rear wheel 19. A chain tensioner 40 (an example of a chain tension applying device) that applies tension to the chain 26 is mounted to the rear end (the mounting lug 24b) of the rear swing arm 24.

Figure 2:
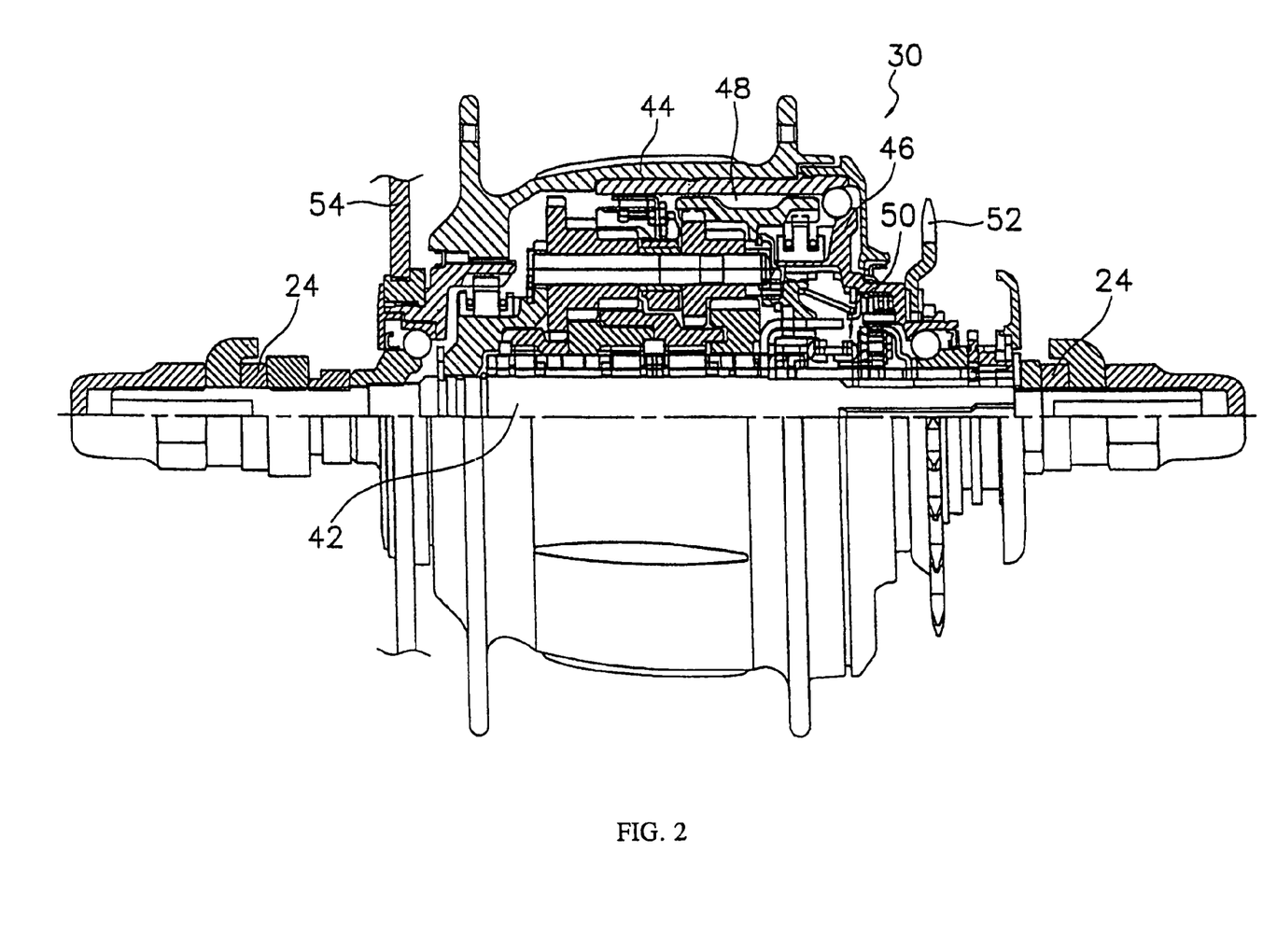
FIG. 2 is a half sectional view of an internal shift hub.

As shown in FIG. 2, the internal shift hub 30 includes a hub shaft 42 of the rear wheel 19 nonrotatably mounted to the rear end of the rear swing arm 24, a hub shell 44 rotatably mounted to the hub shaft 42, a drive body 46 to which a rear sprocket 52 is mounted, a power transmission mechanism 48 having a planetary gear train that transmits rotation of the drive body 46 in an advancing direction to the hub shell 44 through a plurality of power transmission paths, and a switch mechanism 50 that selectively switches the power transmission paths. The internal shift hub 30 as a rear shift device is, for example, an eight-speed hub having eight power transmission paths, and can shift rotation of the gear crank 28 (FIG. 1) to eight speeds and transmit the rotation to the hub shell 44. A disk rotor 54 of a rear disk brake device 36 is mounted to one end (a left end in FIG. 2) of the hub shell 44.

Figure 4:
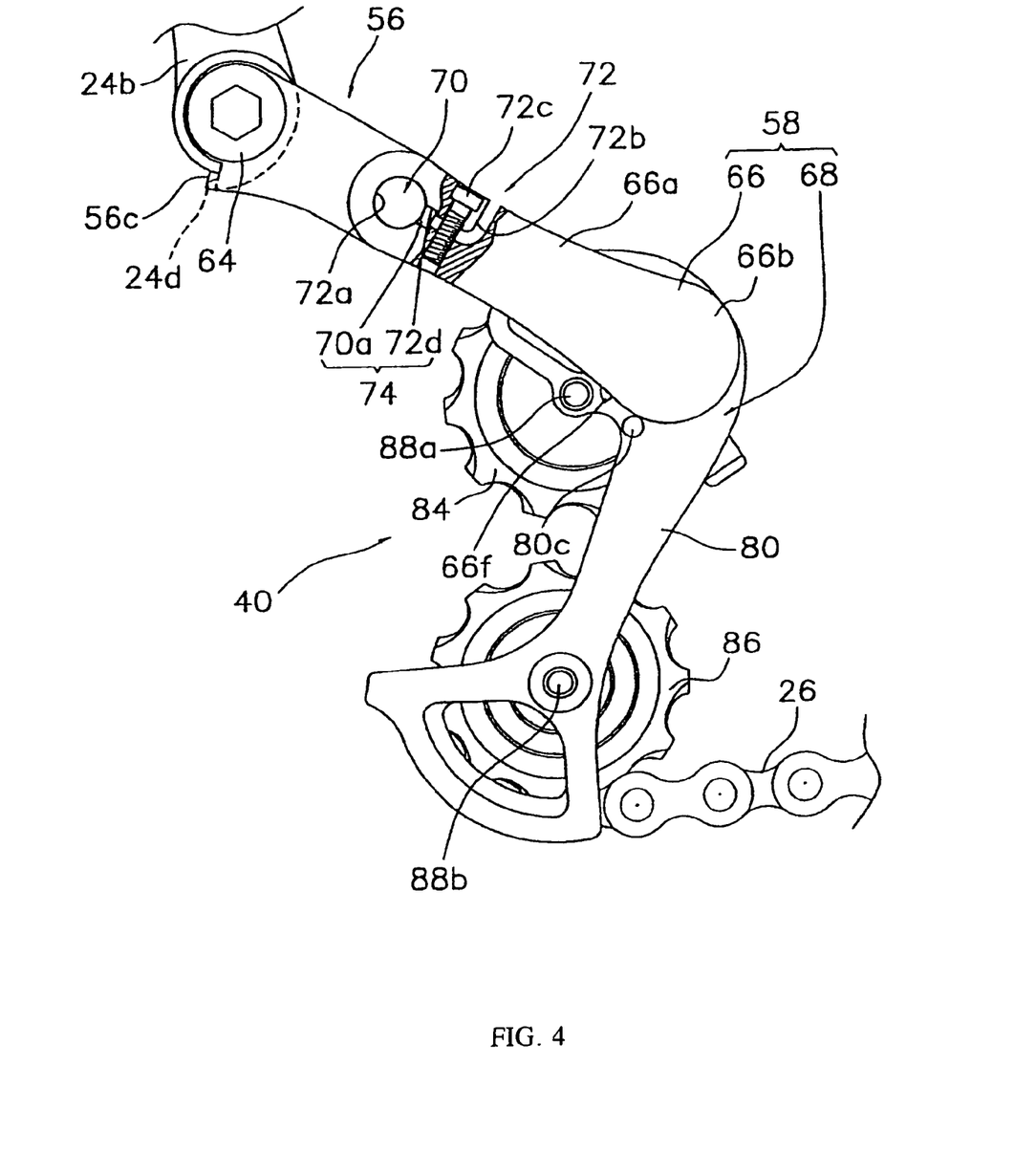
FIG. 4 is a front view of the chain tensioner.
Figure 5:
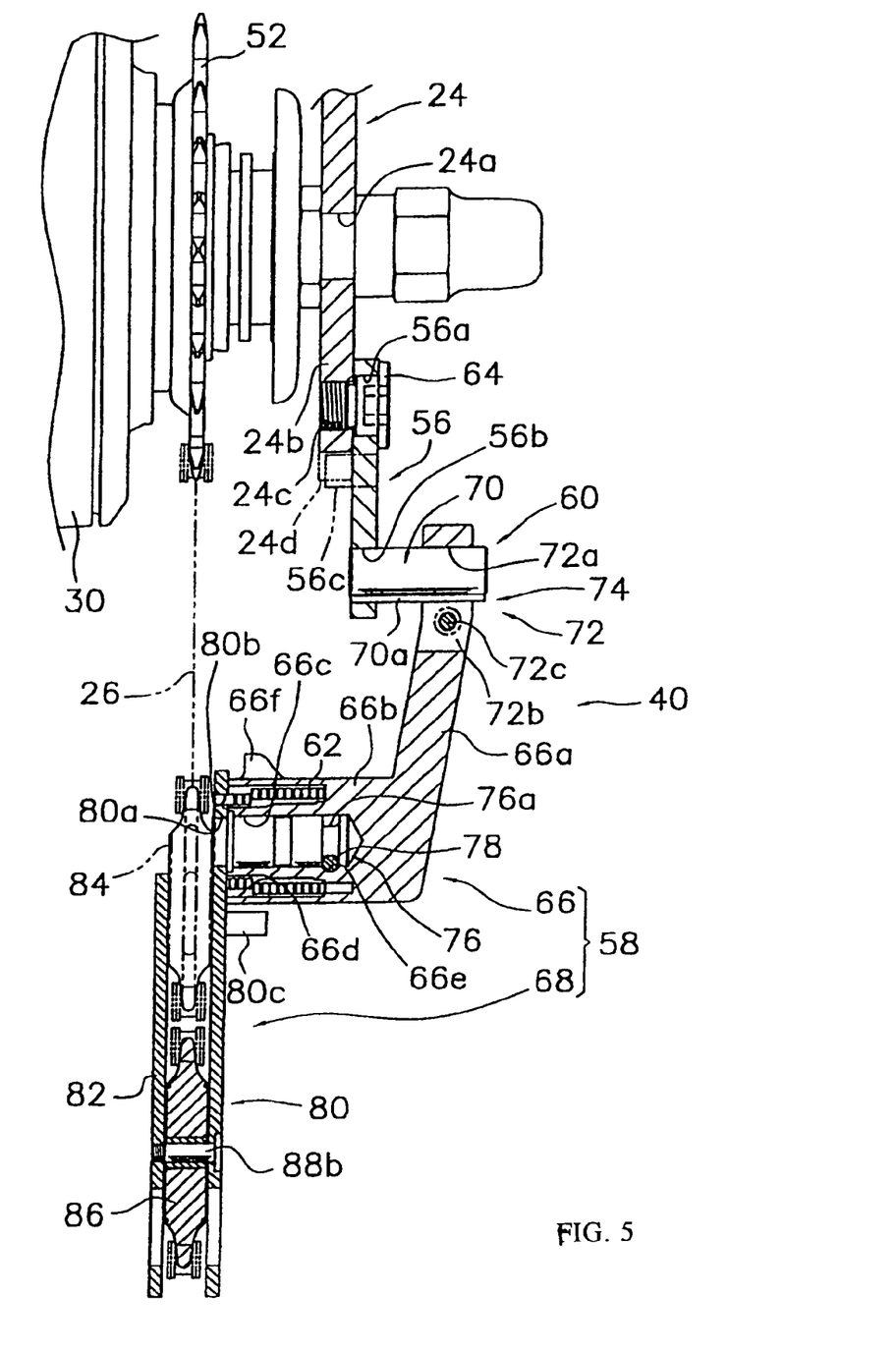
FIG. 5 is a sectional view taken along the line V-V in FIG. 4.

As shown in FIGS. 3 to 5, the chain tensioner 40 is mounted to the mounting lug 24*b*, and applies tension to the chain 26 so as to prevent the chain 26 from being removed from a front sprocket 28*a* of a gear crank 28 or the rear sprocket 52. The chain tensioner 40 includes a bracket 56 mountable to the mounting lug 24*b* of the rear swing arm 24 that is the frame 12 of the bicycle 10, a tension member 58 immovably secured to the bracket 56 in a first direction substantially parallel to an axial direction of a rotation shaft (the hub shaft 42) of the rear sprocket 52, a securing position adjustment mechanism 60 that can adjust a securing position of the tension member 58 to the bracket 56 in the first direction by sliding, and an urging member 62 (FIG. 5) that urges the tension member in a second direction different from the first direction.

The bracket 56 is a sheet-like member made of metal such as stainless alloy secured to the mounting lug 24*b* by a securing bolt 64 screwed into the screw hole 24*c* in the mounting lug 24*b*. The bracket 56 has a through hole 56*a* formed in a base thereof and into which the securing bolt 64 is inserted, and a securing hole 56*b* formed in a tip thereof. The bracket 56 also has, in the base thereof, a positioning piece 56*c* that is a second positioning mechanism contactable with the positioning protrusion 24*d* formed in the mounting lug 24*b*. The positioning piece 56*c* determines a mounting phase of the bracket 56 to the mounting lug 24*b*, and is formed in a folded manner to be contactable with the positioning protrusion 24*d*. The positioning piece 56*c* is formed to determine a mounting phase such that the tip of the bracket 56 is placed in a forward and downward position of the base when the positioning piece 56*c* comes into contact with the positioning protrusion 24*d*.

The tension member 58 is movable in the second direction different from the first direction relative to the bracket 56, and can apply tension to the chain 26. The tension member 58 includes a base member 66 having a base secured so that the securing position is adjustable by the securing position adjustment mechanism 60, and a movable member 68 pivotally supported at a tip of the base member 66 around a shaft parallel to the first direction (an example of the second direction).

The base member 66 is made of metal such as stainless alloy, and includes an arm portion 66*a* having a base secured so that the securing position in the first direction is adjustable by the securing position adjustment mechanism 60, and a cylindrical boss portion 66*b* integrally formed with a tip of the arm portion 66*a*.

The arm portion 66*a* is a sheet-like portion extending in the same direction as the bracket 56, and is bent in the middle thereof so that the tip is placed slightly inward from the base with the arm portion 66*a* being secured to the bracket 56. A clamp portion 72 for securing the base member 66 to a slide shaft 70 secured to the securing hole 56*b* so that the securing position is adjustable is formed in the base of the arm portion 66*a*. The slide shaft 70 and the clamp portion 72 constitute the securing position adjustment mechanism 60. The slide shaft 70 is placed in the first direction, and has a base nonrotatably riveted to the securing hole 56*b* of the bracket. A lock protrusion 70*a* extending axially is formed in an outer periphery of the slide shaft 70. The clamp portion 72 includes a clamp hole 72*a* formed in the base of the arm portion 66*a*, a slit 72*b* formed to be bent from a side of the arm portion 66*a* toward the clamp hole 72*a*, and a clamp bolt 72*c* placed to cross the slit 72*b*. A lock recess 72*d* nonrotatably locked to the lock protrusion 70*a* is formed in an end of the slit 72*b* on the side of the clamp hole 72*a*. The lock protrusion 70*a* and the lock recess 72*d* constitute a first positioning mechanism 74 for determining the mounting phase of the base member 66 to the bracket 56. Specifically, the first positioning mechanism 74 determines the mounting phase of the base member so as to extend in the same direction as the bracket 56.

As shown in FIG. 5, the boss portion 66*b* is a substantially cylindrical member, and has a shaft mounting hole 66*c* having a tip to which a pivot shaft 76 is mounted rotatably and axially immovably, and a spring accommodating portion 66*d* formed to be recessed in a cylindrical shape in a periphery of the shaft mounting hole 66*c*. A screw hole 66*e* is formed in an outer periphery of the shaft mounting hole 66*c* toward the outside. A lock screw 78 is screwed into the screw hole 66*e*. An annular groove 76*a* that the lock screw 78 engages is formed in the pivot shaft 76. This locks the pivot shaft 76 to the boss portion 66*b*. The urging member 62 is accommodated in the spring accommodating portion 66*d*. A positioning protrusion 66*f* for positioning an urging direction of the movable member 68 by the urging member 62 is formed in the outer periphery of the boss portion 66*b*.

The urging member 62 is a torsion coil spring having one end locked in the spring accommodating portion 66*d* and the other end locked to the movable member 68, and accommodated in the spring accommodating portion 66*d* in a twisted manner so as to be able to urge the movable member 68 clockwise in FIG. 4.

The movable member 68 has a shape similar to that of a chain guide used in a rear derailleur. The movable member 68 includes a first plate member 80 pivotally mounted to the base member 66, a second plate member 82 placed to face the first plate member 80, a guide pulley 84 that is rotatably mounted between the plate members 80 and 82 and that the chain 26 engages, and a tension pulley 86 that is rotatably mounted between the plate members 80 and 82 in a position spaced apart from the guide pulley 84 and that the chain 26 engages.

A hole 80*a* to which a tip of the pivot shaft 76 is nonrotatably secured is formed in a base of the first plate member 80. A lock hole 80*b* to which the other end of the urging member 62 is locked is also formed in a periphery of hole 80*a*. Further, a positioning pin 80*c* protruding toward the periphery of the boss portion 66*b* is provided in a standing manner. The positioning pin 80*c* is locked to the positioning protrusion 66*f* to limit a movement range of the movable member 68 in the urging direction.

The second plate member 82 has a shape substantially similar to that of the first plate member 80, and is spaced a predetermined distance from the first plate member 80 so as to hold the pulleys 84 and 86 therebetween.

The guide pulley 84 is placed on the center of rotation side of the plate members 80 and 82. The tension pulley 86 is placed on the tip side of the plate members 80 and 82. The pulleys 84 and 86 are constituted by sprockets having the same number of teeth, and rotatably supported by mounting bolts 88*a* and 88*b* that are screwed into and passed through the plate members 80 and 82 and mount the second plate member 82 to the first plate member 80.

When the chain tensioner 40 thus configured is mounted to the mounting lug 24*b*, the bracket 56 is mounted to the mounting lug 24*b* by the securing bolt 64. Then, the bracket 56 is rotated so as to bring the positioning piece 56*c* into contact with the positioning protrusion 24*d* to fasten the securing bolt 64. Thus, the mounting phases of the bracket 56 and the base member 66 are determined so that the tips thereof are placed in a forward and downward position as shown in FIG. 3. When the chain tensioner 40 is mounted, the chain 26 is wound around the front sprocket 28*a* and the rear sprocket 52 as shown in FIG. 1, and further wound around the guide pulley 84 and the tension pulley 86 between the plate members 80 and 82 as shown by dash-double-dot lines in FIGS. 3 and 5. Then, the chain 26 is cut by a chain cutting tool to a desired length such that tension is applied to the chain 26 by the chain tensioner 40. After the cutting, opposite ends of the chain 26 are connected by a new pin using the chain cutting tool. A chain 26 having a desired length may be previously prepared without cutting.

When the positions of the rear sprocket 52, the guide pulley 84 and the tension pulley 86 are not aligned with the chain 26 being mounted, the securing position of the base member 66 in the first direction is adjusted. For the adjustment, the clamp bolt 72c is once loosened to adjust the securing position of the base member 66 in the first direction so that the rear sprocket 52, the guide pulley 84 and the tension pulley 86 are placed in substantially the same position in the first direction. After the adjustment, the clamp bolt 72c is fastened to secure the base member 66 to the slide shaft 70.

With the chain tensioner 40 having such a configuration, the securing position of the base member 66 of the tension member 58 in the first direction to the bracket 56 mounted to the mounting lug 24b of the rear swing arm 24 can be adjusted by sliding, and thus the first direction is aligned with the axial direction of the rear sprocket 52 to allow a change in a distance between the rear swing arm 24 and the rear sprocket 52 in the first direction to be accommodated. This, of course, also allows a change in a distance between the sprockets caused by a stretch of the chain 26 or rotation of the rear swing arm 24. This prevents the chain 26 from being removed from the sprockets 28a and 52 even if the internal shift hub 30 is mounted to the rear pawl portion 24a of the reverse pawl type.

In the first embodiment, the tension member 58 is constituted by the base member 66 and the movable member 68, while in a second embodiment, a tension member is constituted by a movable member only.

Figure 6:
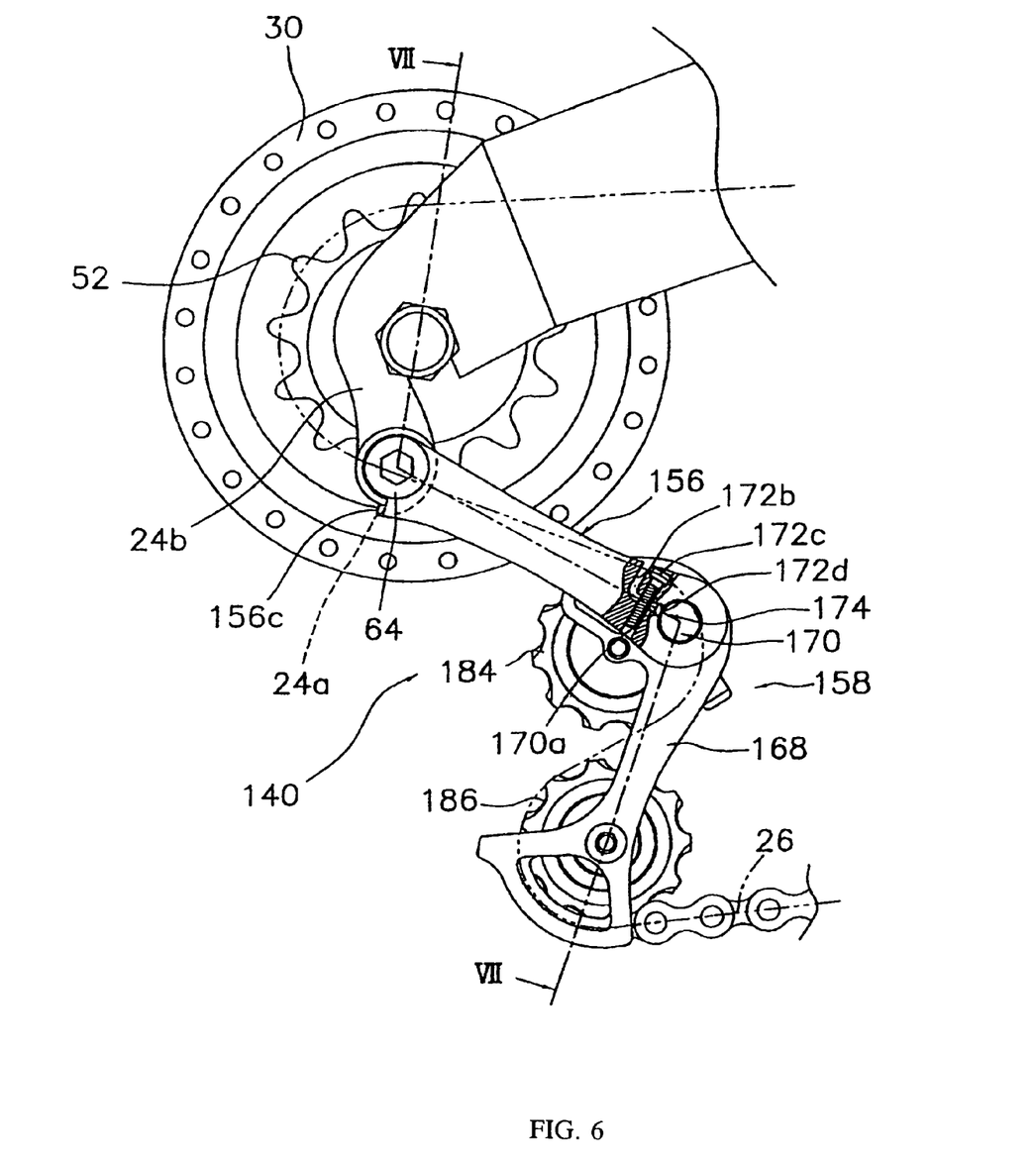
FIG. 6 is a front view of a second embodiment of the present invention.
Figure 7:
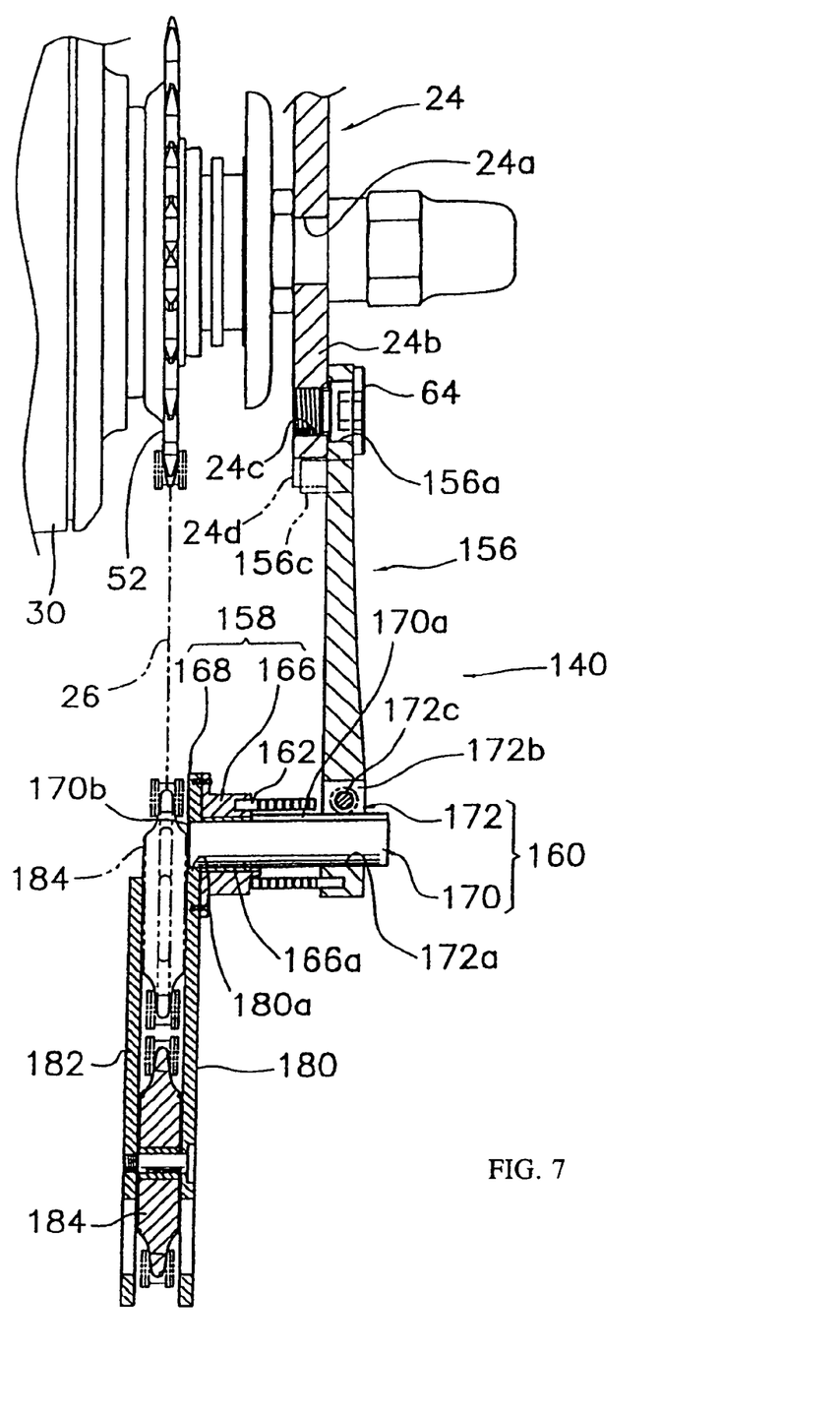
FIG. 7 is a sectional view of the second embodiment.

FIGS. 6 and 7 show a second preferred embodiment of the present invention. In FIGS. 6 and 7, a chain tensioner 140 is mounted to a mounting lug 24b as in the first embodiment, and applies tension to a chain 26 so as to prevent the chain 26 from being removed from a front sprocket 28a of a gear crank 28 or a rear sprocket 52. The chain tensioner 140 includes a bracket 156 mountable to the mounting lug 24b, a tension member 158 secured to the bracket 156 immovably in a first direction substantially parallel to an axial direction of a rotation shaft (a hub shaft 42) of the rear sprocket 52, a securing position adjustment mechanism 160 (FIG. 7) that can adjust a securing position of the tension member 158 to the bracket 156 in the first direction by sliding, and an urging member 162 (FIG. 7) that urges the tension member 158 in a second direction different from the first direction.

The bracket 156 is a sheet-like member made of metal such as stainless alloy secured to the mounting lug 24b by a securing bolt 64 screwed into a screw hole 24c of the mounting lug 24b. The bracket 156 has a through hole 156a formed in a base thereof and into which the securing bolt 64 is inserted, and a clamp portion 172 that is formed in a tip thereof for securing the tension member 158 so that the securing position in the first direction is adjustable. The bracket 156 has, in the base thereof, a positioning piece 156c that is a first positioning mechanism contactable with a positioning protrusion 24d formed in the mounting lug 24b. The positioning piece 156c has a configuration similar to that of the positioning piece 56c.

The securing position adjustment mechanism 160 includes the clamp portion 172 and a slide shaft 170 secured to the clamp portion 172. The slide shaft 170 has a flange 170b in a base (a left end in FIG. 7) thereof and rotatably supports a movable member 168. A lock protrusion 170a extending axially is formed in an outer peripheral surface of the slide shaft 170 except in a rotation support portion. The clamp portion 172 has a clamp hole 172a (FIG. 7) formed in a tip of the bracket 156, a slit 172b formed to be bent from a side of the bracket 156 toward the clamp hole 172a, and a crank bolt 172c placed to cross the slit 172b. A lock recess 172d nonrotatably locked to the lock protrusion 170a is formed in an end of the slit 172b on the side of the clamp hole 172a. Rotation of the slide shaft 170 is prevented by the lock protrusion 170a and the lock recess 172d.

The urging member 162 is a torsion coil spring wound around an outer periphery of the slide shaft 170. The urging member 162 has one end locked to the tip of the bracket 156 and the other end locked to the movable member 168. The urging member 162 is placed between the bracket 156 and the movable member 168 in a twisted manner so as to be able to urge the movable member 168 clockwise in FIG. 6 and in an axially compressed manner. The urging member 162 urges the movable member 168 in a rotation direction, and urges the movable member 168 in the first direction apart from the bracket 156.

The tension member 158 includes a rotation support portion 166 rotatably supported by the slide shaft 170, and the movable member 168 having a base secured to the rotation support portion. The rotation support portion 166 is, for example, a cylindrical member with a flange made of metal such as stainless alloy, and has a bushing 166a therein for supporting rotation. The rotation support portion 166 is secured to the movable member 168, for example, by a screw. One end of the urging member 162 is locked to the rotation support portion 166.

The movable member 168 has a shape similar to that of a chain guide used in a rear derailleur. The movable member 168 includes a first plate member 180 secured to the rotation support portion 166, a second plate member 182 placed to face the first plate member 180, a guide pulley 184 that is rotatably mounted between the plate members 180 and 182 and that the chain 26 engages, and a tension pulley 186 that is rotatably mounted between the plate members 180 and 182 in a position spaced apart from the guide pulley 184 and that the chain 26 engages.

A lock hole 180a into which the flange 170b of the slide shaft 170 is locked is formed in a base of the first plate member 180. This prevents the slide shaft 170 from being removed.

The second plate member 182 has a shape substantially similar to that of the first plate member 180, and is spaced a predetermined distance from the first plate member 180 so as to hold the pulleys 184 and 186 therebetween. Other configurations of the movable member 168 are similar to those of the first embodiment and thus descriptions thereof will be omitted.

When the chain tensioner 140 of the second embodiment thus configured is mounted to the mounting lug 24b, the bracket 156 is mounted to the mounting lug 24b by the securing bolt 64. Then, the bracket 156 is rotated so as to bring the positioning piece 156c into contact with the positioning protrusion 24d to fasten the securing bolt 64. Thus, a mounting phase of the bracket 156 is determined so that the tip is placed in a forward and downward position as shown in FIG. 6. Then, the chain 26 is mounted as in the first embodiment.

When the positions of the rear sprocket 52, the guide pulley 184 and the tension pulley 186 are not aligned with the chain 26 being mounted, the securing position of the tension member 158 in the first direction is adjusted. For the adjustment, the crank bolt 172c is once loosened to allow the slide shaft 170 fastened to the bracket 156 to be freely moved. Then, the securing position of the tension member 158 in the first direction is adjusted so that the rear sprocket 52, the guide pulley 184 and the tension pulley 186 are placed in substantially the same position in the first direction. After the adjustment, the clamp bolt 172c is fastened to secure the bracket 156 to the slide shaft 70.

The chain tensioner 140 having such a configuration also achieves the advantages as described above. In the second embodiment, the securing position adjustment mechanism 160 and the urging member 162 can be placed in the same place, thereby providing a device with a simple entire structure at low costs.

OTHER EMBODIMENTS (a) In the above described two embodiments, the brackets 56 and 156 are mounted to the mounting lug 24b of the frame 12, but a bracket may be mounted to a frame at a hub shaft mounting portion. In this case, if a chamfer for preventing rotation is formed in a hub shaft, the rotation may be prevented by the chamber so as to determine a mounting phase of the bracket, or the rotation may be prevented with respect to the frame.

(b) In the first embodiment, the slide shaft 70 is riveted to the bracket 56, and in the second embodiment, the movable member 168 is rotatably supported by the slide shaft 170, but they may be vice versa. For example, in the first embodiment, the slide shaft 70 may be riveted to the base member, and the clamp portion 72 may be formed in the bracket so that the securing position in the first direction is adjustable. In the second embodiment, the slide shaft 170 may be rotatably mounted to the bracket, and the clamp portion 172 may be provided in the movable member so that the securing position in the first direction is adjustable.

(c) In the second embodiment, the rotation support portion may be extended near the bracket so as to have a shape of the boss portion in the first embodiment and accommodate the urging member therein. This provides a simple positioning structure in the urging direction.

(d) In the embodiment, the chain tensioner 40 is placed in the rear portion of the frame, and thus placed near the rear sprocket 52. However, the chain tensioner 40 may be placed near the front sprocket 28a or in an intermediate portion between the sprockets 28a and 52.

(e) In the embodiment, the securing position is not indicated, but for example, a distance from the pulleys 84 and 86 to an inner side surface that comes into contact with the mounting lug 24b of the bracket 56 is regarded as the securing position to indicate the securing position by an inscription, for example, in the slide shaft, with the side surface of the base member 66 being an indicator.

What is claimed is:

1. A chain tension applying device for a bicycle, comprising:
    a bracket mountable to a frame of the bicycle;
    a tension member that includes a base member and a moveable member,
    a slide shaft extending from one of the bracket and the base member in a direction substantially parallel to an axle of the bicycle; and
    wherein the other of the base member and the bracket has an opening defined therein through which the slide shaft extends, such that the tension member is slidable in an axial direction along the slide shaft, wherein the other of the tension member and the bracket includes a fastener for securing the tension member in a fixed position on the slide shaft, wherein the base member includes an urging member that pivots the movable member in a plane that is substantially perpendicular to an axle of the bicycle.

2. The chain tension applying device for a bicycle of claim 1 wherein the base member includes an arm portion and a boss portion, wherein the opening through which the slide shaft extends is defined in the arm portion and wherein the urging member is disposed in the boss portion.

3. The chain tension applying device for a bicycle of claim 2, wherein the arm portion includes a slot defined therein that extends from the opening in the arm portion to a side of the arm portion to form a clamp portion, and wherein the fastener extends across the slot to secure the tension member in a fixed position on the slide shaft.

4. The chain tension applying device for a bicycle of claim 1 wherein the movable member comprises a first plate member, a second plate member spaced apart from the first plate member, and a tension pulley that is rotatably mounted between the plate members.

5. The chain tension applying device for a bicycle of claim 2, wherein the slide shaft includes an axially extending lock protrusion that is received in a corresponding lock recess defined in the arm portion.

6. A method of tensioning a bicycle chain, the method comprising the steps of:
    a. providing a chain tension applying device that includes a bracket mounted to a frame of the bicycle, a slide shaft non-rotatably secured to and extending outwardly from the bracket in a direction substantially parallel to the rear axle of the bicycle, a tension member slidable on the slide shaft in a direction substantially parallel to the rear axle of the bicycle, and a clamp portion for securing the tension member in a fixed position on the slide shaft,
    b. unclamping the clamp portion,
    c. sliding the tension member along the slide shaft, thereby tensioning the chain, wherein the slide shaft is stationary with respect to the bicycle frame and the tension member is movable relative to the slide shaft and the bicycle frame, and
    d. tightening the clamp portion to place a clamp force on the slide shaft.

* * * * *